(12) United States Patent
Aokage (10) Patent No.: US 8,736,719 B2
(45) Date of Patent: May 27, 2014

(54) IMAGE PROCESSING APPARATUS AND CONTROL METHOD FOR THE SAME

(75) Inventor: Hironori Aokage, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 13/455,499

(22) Filed: Apr. 25, 2012

(65) Prior Publication Data

US 2012/0274855 A1 Nov. 1, 2012

(30) Foreign Application Priority Data

Apr. 28, 2011 (JP) ................................. 2011-102342

(51) Int. Cl.
*H04N 5/217* (2011.01)
*H04N 5/08* (2006.01)

(52) U.S. Cl.
USPC .......................................... 348/241; 348/533

(58) Field of Classification Search
USPC ............ 348/241–251, 607, E5.077, 193, 470, 348/533, 535, 606, 608, 622, 627, 683, 701, 348/E7.052, E5.083, 908, 909
See application file for complete search history.

(56) References Cited

U.S. PATENT DOCUMENTS

| | | | |
|---|---|---|---|
| 2005/0168651 A1* | 8/2005 | Morino | 348/700 |
| 2006/0220932 A1* | 10/2006 | Okumichi et al. | 341/55 |
| 2007/0024748 A1* | 2/2007 | Kubota | 348/533 |
| 2010/0208133 A1* | 8/2010 | Crabb et al. | 348/441 |

FOREIGN PATENT DOCUMENTS

| | | |
|---|---|---|
| JP | 2000-209507 A | 7/2000 |
| JP | 2009-147822 A | 7/2009 |

\* cited by examiner

*Primary Examiner* — Nhan T Tran
*Assistant Examiner* — Chan Nguyen
(74) *Attorney, Agent, or Firm* — Carter, DeLuca, Farrell & Schmidt, LLP (57) ABSTRACT

In an image processing apparatus, information indicating a degree of correlation between a current frame and a previous frame is computed based on a pixel value in the current frame before being subjected to the recursive noise reduction and a pixel value in the previous frame after being subjected to the recursive noise reduction. Then, a recursive coefficient, which is a weight of the previous frame, is determined based on the degree of correlation and a frame rate of the moving image. The recursive noise reduction is applied to the current frame by combining the pixels in the previous frame and the current frame using the recursive coefficient. For the same degree of the correlation, the recursive coefficient is determined to be smaller as the frame rate is lower. Noise reduction in accordance with the image frame rate is achieved.

9 Claims, 7 Drawing Sheets

IMAGE PROCESSING APPARATUS AND CONTROL METHOD FOR THE SAME

BACKGROUND OF THE INVENTION

1. Field of the Invention

The present invention relates to an image processing apparatus and a control method therefor, and in particular to an image processing apparatus for reducing noise in image signals and a control method therefor.

2. Description of the Related Art

Image signals obtained with image sensors generally contain noise components. Among noise components, random noise generated temporally or spatially in random is generated mainly during high-sensitivity shooting. Especially, noise generated temporally in random is one of the factors that degrade the image quality of moving images.

As a random noise reduction technique for moving images, recursive noise reduction using correlation between moving image frames is known. For example, Japanese Patent Laid-open No. 2000-209507 discloses a technique of controlling a recursive coefficient in the recursive noise reduction based on a difference signal value between the image signal of the current frame and the image signal of the previous frame. A recursive coefficient is a coefficient indicating a proportion of components of a previous frame to be used in noise reduction on an image signal of a current frame. If the difference between the current and previous frames is large, afterimage is reduced by using a small recursive coefficient, and if the difference is small, noise is reduced by using a large recursive coefficient.

The method disclosed in Japanese Patent Laid-Open No. 2000-209507 controls the recursive coefficient based on a difference signal value, and so the computational complexity is small and the cost can be reduced. However, the accuracy of separation between random noise and moving components between frames is not enough, and therefore the image quality acquired after the noise reduction is insufficient.

Meanwhile, in Japanese Patent Laid-Open No. 2009-147822, temporal random noise is eliminated while afterimage of a moving object is suppressed by using a difference between the current frame that has been subjected to spatial noise reduction and one or more past frames (after being subjected to the spatial noise reduction). With the method disclosed in Japanese Patent Laid-Open No. 2009-147822, the accuracy of separation between random noise and moving components between frames is improved, and relatively high image quality can be obtained.

However, Japanese Patent Laid-Open No. 2009-147822 does not disclose noise reduction in which the image frame rate is considered. The temporal distance between frames (shooting time interval) varies depending on whether or not the image frame rate is high or low, and the degree of a correlation between consecutive frames is also affected. However, uniform noise reduction has been conventionally performed without considering frame rates. Accordingly, with the methods disclosed in Japanese Patent Laid-Open Nos. 2000-209507 and 2009-147822 sufficient effects cannot be achieved in the case where the image frame rate is variable.

SUMMARY OF THE INVENTION

The present invention was made in light of the above-described problem in the conventional techniques, and provides an image processing apparatus for applying recursive noise reduction to moving images and a control method therefor that achieve noise reduction in accordance with image frame rates.

The first aspect of the present invention provides an image processing apparatus for applying recursive noise reduction to a moving image having a predetermined frame rate, the image processing apparatus comprising: a computation unit that computes information indicating a degree of correlation between a current frame and a previous frame that is one frame before the current frame, using a pixel value of the current frame to which the recursive noise reduction is to be applied and a pixel value of the previous frame to which the recursive noise reduction has been applied; a determination unit that determines a recursive coefficient, which is a weight of the previous frame, based on the degree of correlation and the frame rate; a first combination unit that combines pixels in the previous frame and the current frame using the recursive coefficient; and an output unit that outputs the frame obtained by the first combination unit as the current frame to which the recursive noise reduction has been applied, wherein for the same degree of correlation indicated by the information computed by the computation unit, the determination unit determines the recursive coefficient to be smaller as the frame rate is lower.

The second aspect of the present invention provides a method for controlling an image processing apparatus for applying recursive noise reduction to a moving image having a predetermined frame rate, the method comprising: a computing step of computing unit in the image processing apparatus, the step of computing information indicating a degree of a correlation between a previous frame and a current frame using a pixel value of the current frame to which the recursive noise reduction is to be applied and a pixel value of the previous frame that is one frame before the current frame to which the recursive noise reduction has been applied; a determining step performed by determination unit in the image processing apparatus, the step of determining a recursive coefficient, which is a weight of the previous frame, based on the degree of the correlation and the frame rate; a first combining step performed by first combination unit in the image processing apparatus, the step of combining pixels in the previous frame and the current frame using the recursive coefficient; and an outputting step performed by output unit in the image processing apparatus, the step of outputting the frame obtained by the first combination unit as the current frame after subjected to the recursive noise reduction, wherein in the determining step, for the same degree of the correlation indicated by the information computed by the computation unit, the determination unit determines the recursive coefficient to be smaller as the frame rate is lower.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First embodiment

Exemplary embodiments of the present invention will now be described in detail in accordance with the accompanying drawings. In the following description, a digital camera having a movie shooting function is described as an example of an image processing apparatus according to the present invention. However, the movie shooting function is not essential for the present invention, and the invention is applicable to any devices capable of processing moving images such as information processing apparatuses.

Configuration of Digital Camera

Figure 1:
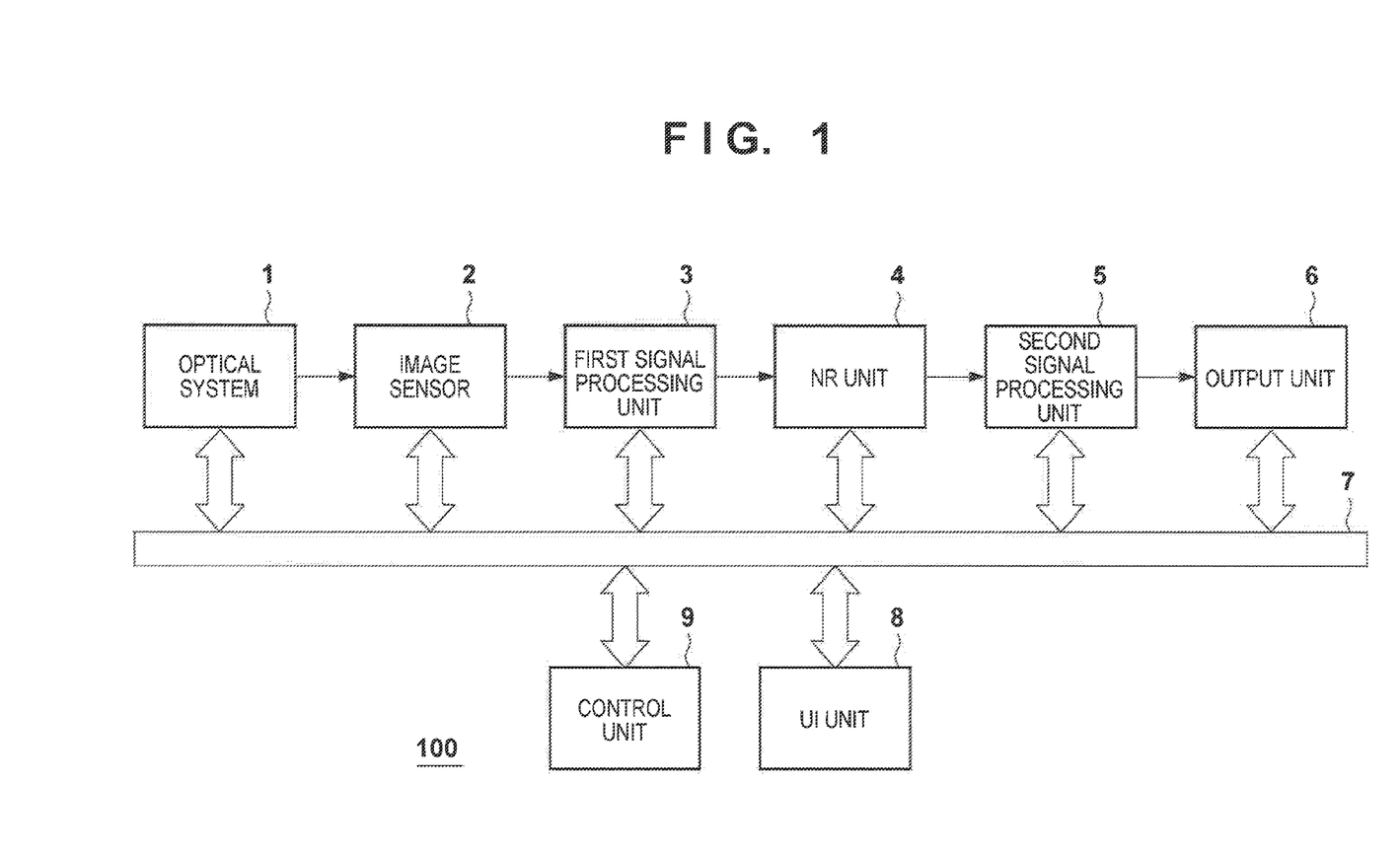
FIG. 1 is a block diagram showing an exemplary configuration of a digital camera as an example of an image processing apparatus according to a first embodiment of the present invention.

FIG. 1 is a block diagram schematically showing constituent elements related to movie shooting and noise reduction in a digital camera according to the present embodiment.

In a digital camera 100, an optical image formed by an optical system 1 including a diaphragm and lens is photoelectrically converted by an image sensor 2 such as a CMOS or CCD image sensor, and supplied as an analog image signal in units of pixels to a first signal processing unit 3. The first signal processing unit 3 performs A/D conversion and gain control on the analog image signal and supplies this signal as a digital image signal to a noise reduction unit (NR unit) 4. The NR unit 4 applies recursive noise reduction to the digital image signal and supplies this signal to a second signal processing unit 5. The second signal processing unit 5 performs resizing, color calibration, and the like on the digital image signal that has been subjected to the noise reduction and supplies the signal to an output unit 6. The output unit 6 performs one or more of outputting to an output interface such as an HDMI, recording on a storage media such as a semiconductor memory card, and outputting to a display device (not shown) in the digital camera 100.

A UI unit 8 has one or more input devices such as a switch, a button, and a touch panel provided to the display device (not shown), and is used by a user to configure various settings or give instructions to the digital camera 100. Instructions to switch between a movie shooting mode and a still image shooting mode, instructions to switch between a shooting mode and a reproduction mode, instructions to start, pause, and stop movie shooting, and operations of GUIs displayed on the display device are input by a user via the UI unit 8 to the digital camera 100.

A control unit 9 controls the entire operation of the digital camera 100. The control unit 9 includes, for example, a CPU, and a RAM halving nonvolatile areas and ROM, and expands a control program stored in the ROM to the RAM, and the CPU then executes the program to control each component to implement various functions of the digital camera 100. Set values such as image parameters including an image frame rate and a resolution configured via the UI unit 8 are stored in, for example, the nonvolatile RAM in the control unit 9. The components shown in FIG. 1 are connected via a bus 7 such that they can communicate with each other.

Configuration of NR Unit 4

Figure 2:
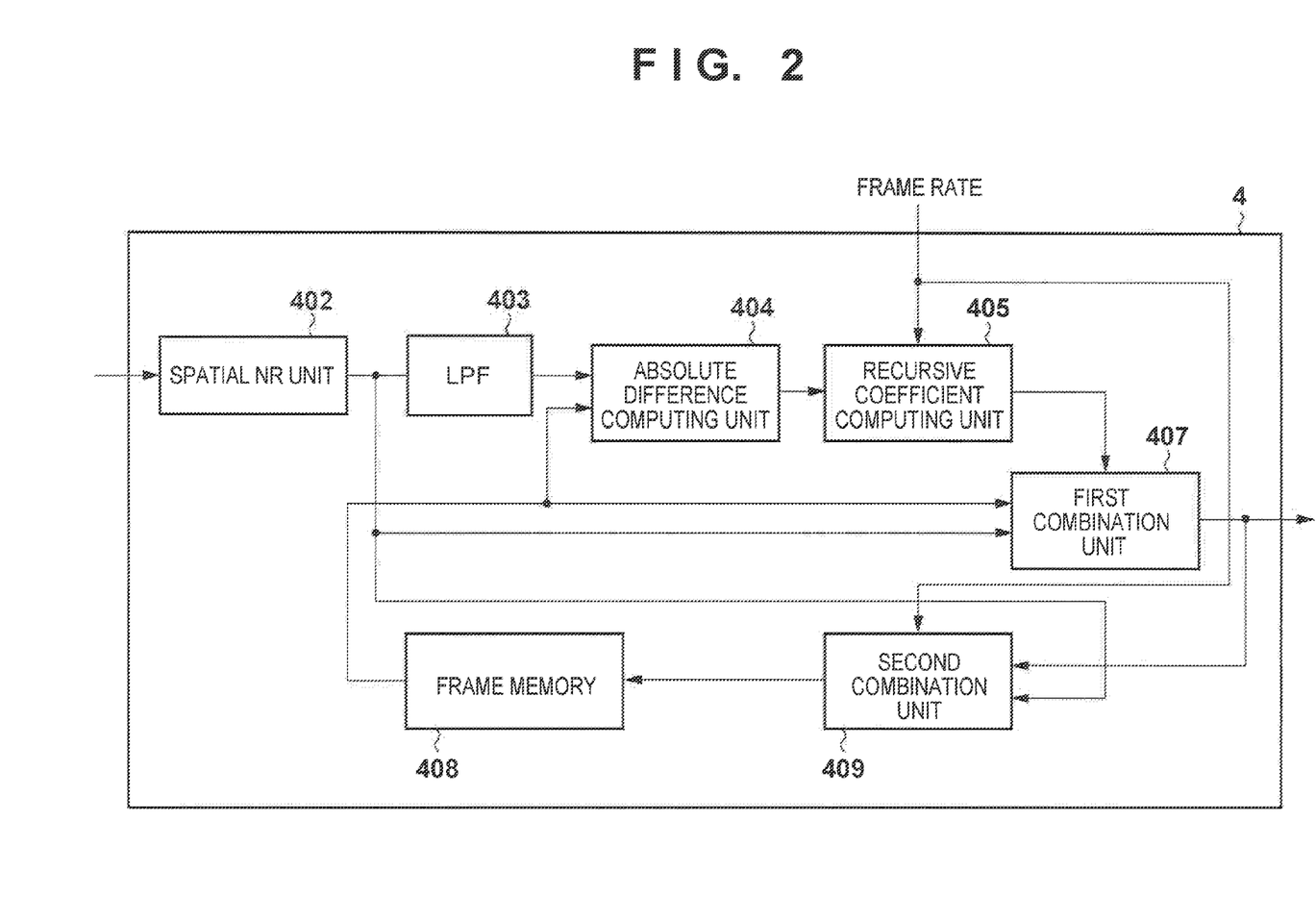
FIG. 2 is a block diagram showing an exemplary configuration of a noise reduction unit 4 in FIG. 1.

FIG. 2 is a block diagram showing an exemplary configuration of the NR unit 4. The configuration and operation of the NR unit 4 are hereinafter described with reference to FIG. 2.

A spatial NR unit 402 performs two-dimensional (spatial) noise reduction on a digital image signal input via an input terminal 401 from the first signal processing unit 3 and supplies this signal to a low-pass filter (LPF) 403, a first combination unit 407, and a second combination unit 409.

An image frame rate input via the bus 7 from, for example, the UT unit 8 or the control unit 9 is supplied to a recursive coefficient computing unit 405 and the second combination unit 409. The LPF 403 performs two-dimensional low-pass filtering on the digital image signal that has been subjected to the two-dimensional noise reduction and outputs the signal to an absolute difference computing unit 404.

The absolute difference computing unit 404 computes an absolute difference between the digital image signal that has been subjected to the two-dimensional noise reduction and low-pass filtering and a digital image signal output from a frame memory 408, and supplies a result to the recursive coefficient computing unit 405.

The recursive coefficient computing unit 405 computes a recursive coefficient based on an image frame rate and an absolute difference and supplies a result to the first combination unit 407. Here, a recursive coefficient is a coefficient indicating a ratio of image signal components in a past frame from the frame memory 408 used in noise reduction for an image signal for a current frame.

The first combination unit 407 combines the noise reduced digital image signal (for a current frame) output by the spatial NR unit 402 and a digital image signal output by the frame memory 408 based on the recursive coefficient from the recursive coefficient computing unit 405. Then, the first combination unit 407 supplies the combined image signal to the second combination unit 409 and the second signal processing unit 5 downstream of the NR unit 4.

The second combination unit 409 combines, based on the image frame rate, the combined image signal output by the first combination unit 407 and the digital image signal for the current frame that has been subjected to spatial noise reduction by the spatial NR unit 402, and supplies the combined signal to the frame memory 408.

The frame memory 408 delays input image signal for one frame time and supplies the signal to the first combination unit 407 and the absolute difference computing unit 404.

Specific Example of Operation of NR Unit 4

A specific example of noise reduction operation performed by the NR unit 4 is described. In the following example, it is assumed that a moving image signal is captured at an image frame rate configured from the UI unit 8, but moving image data subjected to the noise reduction and the method for inputting the frame rate is not particularly limited. For example, moving image data read out by the output unit 6 from a recording medium and a frame rate acquired from a header or the like in the moving image data may be provided to the NR unit 4. Frame rates do not have to be necessarily input from external devices of the NR unit 4 and may alternatively be extracted from moving image data or determined by the NR unit 4.

Moving image signals are sequentially input in units of frames from the first signal processing unit 3. In the present embodiment, the resolution of moving images is 1920 pixels× 1080 pixels, and the image frame rate may be selected from among 60 frames per seconds fps) and 24 fps. The image sensitivity (ISO sensitivity) is assumed to be 12800.

Figure 3:
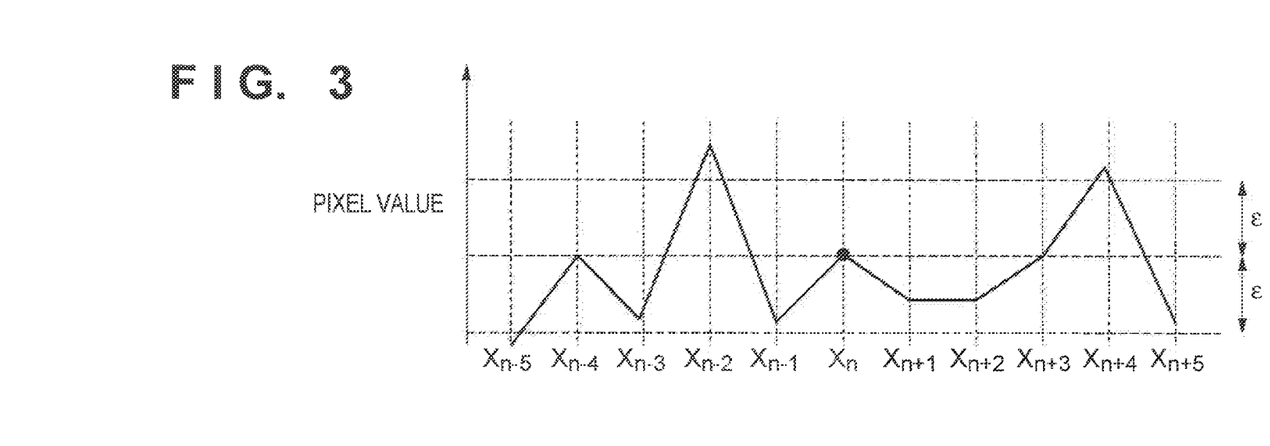
FIG. 3 is a diagram depicting filtering performed by a spatial NR unit 402 in the noise reduction unit 4.

The spatial NR unit 402 performs spatial noise reduction using a ε-filter. Assuming a pixel value of the pixel of interest is $X_n$, noise is reduced by performing smoothing using neighboring pixel values $X_{n-5}$ to $X_{n-5}$, where only the pixel values within a range of difference between the pixel value $X_n$ of the pixel of interest and ε is used as shown in FIG. 3. In the example of FIG. 3, $X_{n-5}$, $X_{n-2}$, and $X_{n+4}$, of which the difference from $X_n$ exceeds ε, are replaced with $X_n$ and a weighted mean of $X_{n-5}$ to $X_{n+5}$ is calculated. The calculation formula is as shown below:

$$y_n = \sum_{k=-5}^{5} a_k x_{n-k} \quad (1\text{-}1)$$

$$x_{n-k} = \begin{cases} x_{n-k} & \text{when } |x_n - x_{n-k}| \leq \varepsilon \\ x_n & \text{when } |x_n - x_{n-k}| > \varepsilon \end{cases} \quad (1\text{-}2)$$

where $a_k$ represents the weight in each pixel, which is configured to be smaller as the pixel is geometrically farther from $x_k$, and configured to be larger as the pixel is closer to $x_k$. The number of taps (11 in this example) and the number of neighboring pixels (10 in this example) used in the smoothing are only an example and not limited thereto.

The spatial NR unit 402 performs two-dimensional noise reduction by applying the above-described one-dimensional filtering to horizontal and vertical directions of the image.

Figure 4:
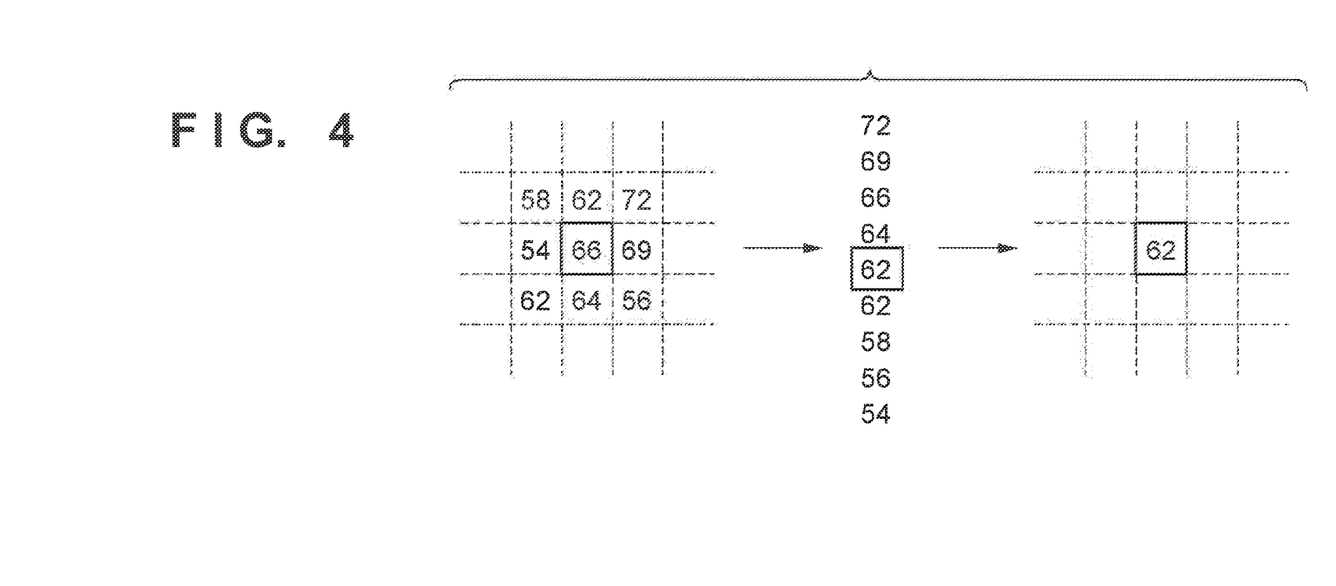
FIG. 4 is a diagram depicting filtering performed by an LPF 403 in the noise reduction unit 4.

The LPF 403 uses a median filter in a 3×3 region. Here, 9 pixels within the 3×3 region are sorted by the pixel values, and the median value is output as $I_n$. A specific example of the operation of the LPF 403 is shown in FIG. 4. The LPF 403 performs such filtering on an image output by the spatial NR unit 402.

Assuming that an image output by the frame memory 408 is referred to as "the previous frame" and an image output by the LPF 403 is referred to as "the current frame," the absolute difference computing unit 404 computes an absolute difference between each pixel in the previous frame and the corresponding pixel in the current frame. The calculation formula is as shown below:

$$d_n = |p_n - l_n| \quad (1\text{-}3)$$

where $l_n$ and $p_n$ are pixel values in the previous and current frames, respectively.

Next, the recursive coefficient computing unit 405 is described. In this embodiment, a recursive coefficient $K(1 \geq K \geq 0)$ is determined in consideration of not only the absolute difference $d_n$ but also the image frame rate. Specifically, the value of the recursive coefficient K is determined to be larger as the value of the absolute difference $d_n$ is smaller, and for the same absolute difference $d_n$, the value of the recursive coefficient K is determined to be larger as the image frame rate is higher. Alternatively, the value of the recursive coefficient K is determined to be smaller as the absolute difference $d_n$ is larger, and for the same absolute difference $d_n$, the value of the recursive coefficient K is determined to be smaller as the image frame rate is lower.

"The recursive coefficient K being larger as the value of absolute difference $d_n$ being smaller" unit that the recursive coefficients K corresponding to all combinations of $d_a$ and $d_b$ (where $d_a < d_b$) satisfy $K_a \geq K_b$. The same applies to a plurality of recursive coefficients K corresponding to the same absolute difference $d_n$ and different image frame rates.

A specific example is described. For example, it is assumed that the values of the absolute difference $d_n$ are in the range of 0 to 255 (8 bits), and recursive coefficients K corresponding to the absolute differences $d_n$ of a plurality of discrete values, for example $d_n$=0, 10, 20, 30, 40, 50, 60, 70, 120, 150, and 180 are determined.

For example, assuming the value of the recursive coefficient K corresponding to $d_n$ is $K_{dn}$, the recursive coefficients K in the case of the image frame rates of 60 fps and 24 fps can be determined as below;

TABLE 1

|  | Image frame rate | |
| --- | --- | --- |
|  | 60 fps | 24 fps |
| $K_0$ | 1 | 1 |
| $K_{10}$ | 1 | 0.9 |
| $K_{20}$ | 1 | 0.7 |
| $K_{30}$ | 1 | 0.3 |
| $K_{40}$ | 0.9 | 0 |
| $K_{50}$ | 0.45 | 0 |
| $K_{60}$ | 0.4 | 0 |
| $K_{70}$ | 0.3 | 0 |
| $K_{120}$ | 0.25 | 0 |
| $K_{150}$ | 0.2 | 0 |
| $K_{180}$ | 0 | 0 |

Figure 5A:
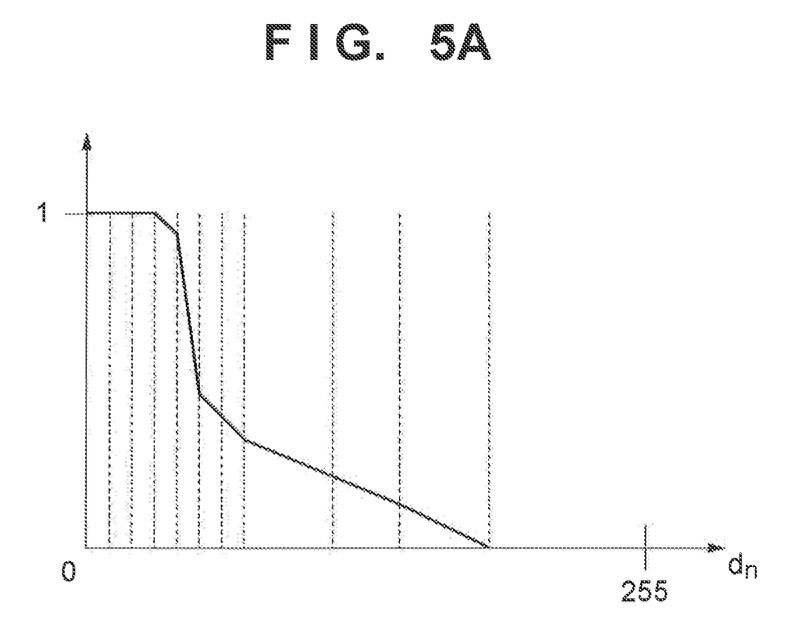
FIGS. 5A and 5B are diagrams showing a specific example of a recursive coefficient according to the first embodiment of the present invention.
Figure 5B:
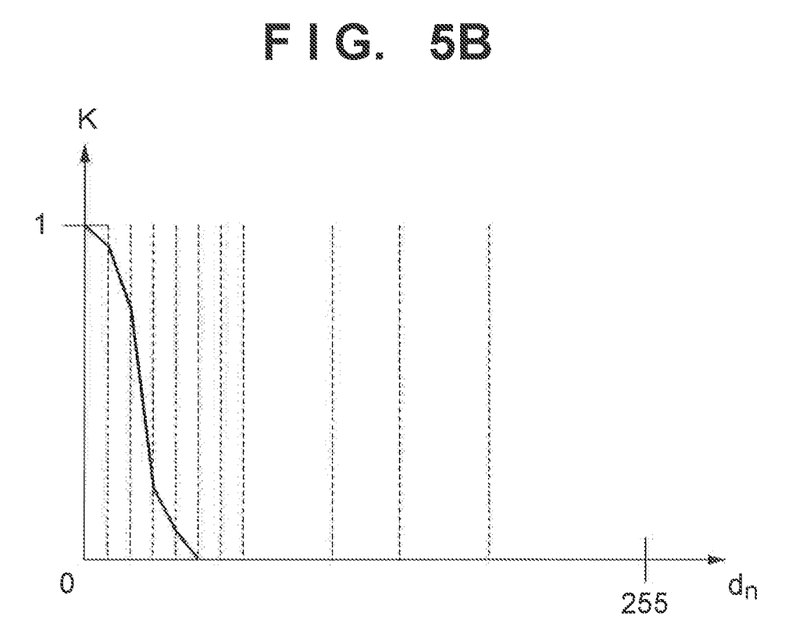

The values of the recursive coefficient K corresponding to other values of the absolute difference $d_n$ can be computed by, for example, performing linear interpolation on neighboring values. FIGS. 5A and 5B show the relationship between K and $d_n$ in an orthogonal coordinate system, which are indicated by the vertical and horizontal axes, respectively. FIGS. 5A and 5B show the state where liner interpolation is performed. All recursive coefficients K corresponding to $d_n$ that is equal to or larger than $d_n$ with which K=0 are 0, and all recursive coefficients K corresponding to $d_n$ that is equal to or smaller than $d_n$ with which K=1 are 1, and therefore linear interpolation is not necessary for those recursive coefficients K.

If an absolute difference $d_n$ is large or the image frame rate is low, the correlation between frames is likely to be small. Therefore, the value of the recursive coefficient K is determined to be smaller as the absolute difference $d_n$ is larger or the image frame rate is lower. The contribution of past frames whose correlation is considered to be low to pixel combination is thereby reduced.

In this example, the recursive coefficients K for the two types of image frame rate corresponding to eleven absolute differences are determined. However, the type of image frame rate and the number of recursive coefficients K per image frame rate are not limited. Further, instead of calculating the recursive coefficients K corresponding to a plurality of discrete values of the absolute difference, a value of the recursive coefficient may also be calculated by registering a function between values of the absolute difference and the recursive coefficient for every image frame rate, and substituting the absolute difference for the function. Further, it is not necessary to determine the same number of the recursive coefficients as the discrete values of the absolute difference for every image frame rate. It is also not necessary to compute the recursive coefficients corresponding to discrete values of the same absolute difference for all image frame rates. In the example shown in FIG. 1, $K_{50}$ to $K_{180}$ at 24 fps and $K_0$ to $K_{20}$ at 60 fps are not necessary.

The recursive coefficient computing unit 405 thus computes a value of the recursive coefficient K for each pixel using the image frame rate and the absolute difference, and supplies the value to the first combination unit 407.

The first combination unit 407 calculates, using the recursive coefficient K, a weighted mean between a pixel value $y_n$ in a current frame that is an output from the spatial NR unit 402 and a pixel value $p_n$ at the corresponding location in the immediately previous frame that is an output from the frame memory 408 as below:

$$O_n = K^* p_n + (1-K)^* yn \tag{1-4}$$

The second combination unit 409 performs combination by calculating a weighted mean with a certain weight w as shown below between:

the pixel value $y_n$ in a current frame output by the spatial NR unit 402 before being subjected to the recursive noise reduction; and the pixel value $o_n$ at a corresponding location in a current frame output by the first combination unit 407 after being subjected to the recursive noise reduction.

The current frame used here is the same as the current frame used by the first combination unit 407. If necessary, the current frame is delayed at, for example, the second combination unit 409 until the processing performed by the first combination unit 407 ends.

$$m_n = w^* o_n + (1-w)^* y_n \tag{1-5}$$

The second combination unit 409 varies the weight w in accordance with the image frame rate. For example, the weight is set such that w=0.9 at the image frame rate of 60 fps, and w=0.6 at the image frame rate of 24 fps. The above-computed value $m_n$ is delayed for one frame time by the frame memory 408, and is used as $p_n$ in the next frame time.

As described above, in this example, the weight of the image from the first combination unit 407 is made smaller by the second combination unit 409 as the image frame rate is lower, and the image combined with the current frame image is stored in the frame memory 408. Alternatively, the weight of the image from the first combination unit 407 is made larger as the image frame rate is higher, and the image combined with the current frame image is stored in the frame memory 408. With this configuration, blur or halos on objects in an image of the next frame obtained by the first combination unit 407 can be further suppressed.

As described above, according to the present embodiment, in the recursive noise reduction in which noise in a moving image is reduced by combining images of a plurality of frames, the weight of the previous frame used in the combination is made smaller as the image frame rate is lower. By doing so, the influence from a frame with a small correlation is suppressed and appropriate noise reduction can be performed. Further, if the image frame rate is high, noise reduction using a past frame with a high correlation can be achieved.

Further, as a past frame image used in the combination, rather than a delayed image in a frame after being subjected to noise reduction, delayed combined images in the frame before and after being subjected to noise reduction are used. At this time, the weight of the frame image after being subjected to the noise reduction (after the combination) is made smaller as the image frame rate is lower. By doing so, the influence on the noise reduction for the subsequent frames from blur or halos on outlines of objects occurring in the frame image after being subjected to the noise reduction can be suppressed.

Variation of the First Embodiment

If it is desired to reduce the circuit scale or simplify the processing, the second combination unit 409 need not be used. Specifically, the settings may be configured such that in FIG. 2 the frame image output by the first combination unit 407 after being subjected to the noise reduction is directly input to the frame memory 408. In this case, improvement in image quality due to the second combination unit 409 cannot be obtained, but the improvement effect that comes from the combination by the first combination unit 407 in accordance with image frame rate can be achieved.

Second Embodiment

Furthermore, the present invention is also achieved by performing the following processing. Specifically, software (a program) for implementing the functions in the above-described embodiment is supplied via a network or various storage media to a system or apparatus, and a computer (or devices such as a CPU or MPU) of the system or apparatus reads out and executes the program.

Figure 6:
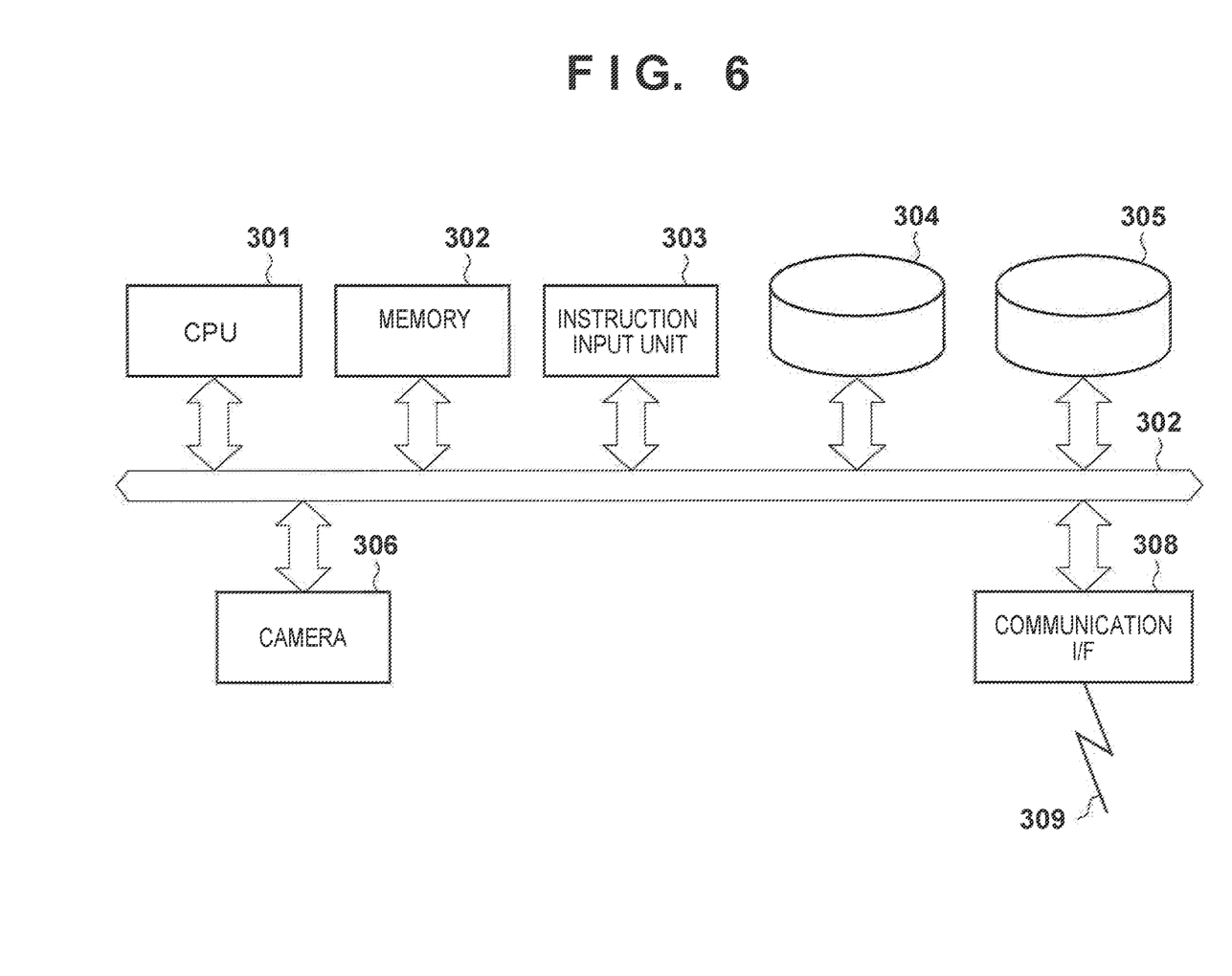
FIG. 6 is a block diagram showing an exemplary configuration of an information processing apparatus serving as an example of an image processing apparatus according to a second embodiment of the present invention.

FIG. 6 is a block diagram showing an exemplary configuration of an information processing apparatus to which the present invention is applicable. A CPU 301 controls the entire apparatus and performs various processes. A memory 302 includes a ROM storing BIOS and a boot program and a RAM used as a work area by the CPU 301. An instruction input unit 303 includes a keyboard, a pointing device such as a mouse, and various switches. An external storage device 304 provides an operating system (OS) necessary for controlling this apparatus, a program (image processing application) for causing the information processing apparatus to function as the image processing apparatus according to the present invention, and a storage area necessary for computation. Examples of the external storage device 304 include a hard disk drive. A reader 305 is a storage device for accessing removable media (such as a memory card and a disk media) where moving image data is recorded or stored. A camera 306 captures moving images. The information processing apparatus has a communication interface 308 for communicating with external devices via a wired or wireless communication line 309.

Figure 7:
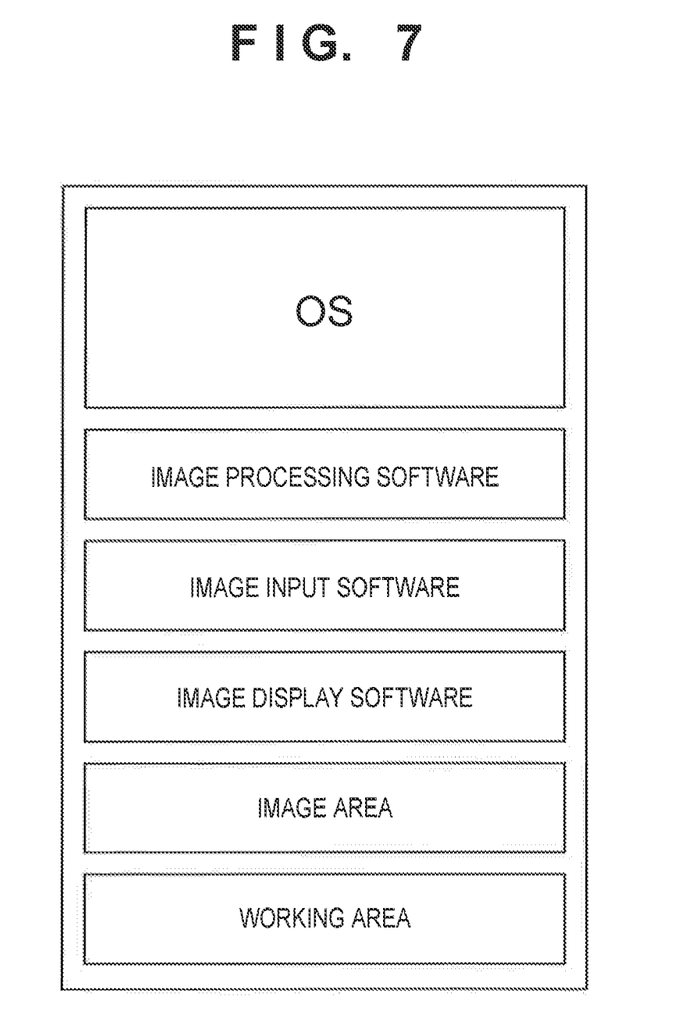
FIG. 7 is a diagram depicting an example of a memory map of the information processing apparatus according to the second embodiment.

When the apparatus is powered on with the instruction input unit 303, the CPU 301 loads the OS from the external storage device 304 into the memory 302 (RAM) in accordance with the boot program (stored in the ROM) in the memory 302. Then, in accordance with, for example, an instruction from a user, the image processing application is loaded into the memory 302 from the external storage device 304 and executed by the CPU 301, and thus the information processing apparatus can function as the image processing apparatus according to the present invention. FIG. 7 schematically shows a memory map where the application program is loaded into the RAM in the memory 302.

The memory 302 stores the OS for controlling the entire apparatus and various kinds of software, and the image processing software for performing spatial NR and recursive NR. The memory 302 also stores image input software for controlling the camera 306 to input (capture) moving images in units of frames. The memory 302 further has an image area to store image data and a working area to store various parameters. A memory area that works as the frame memory 408 is also secured in the working area. In the following description, this memory area is referred to as "frame memory 408." The table shown as Table 1 can be stored in the external storage device 304.

Figure 8:
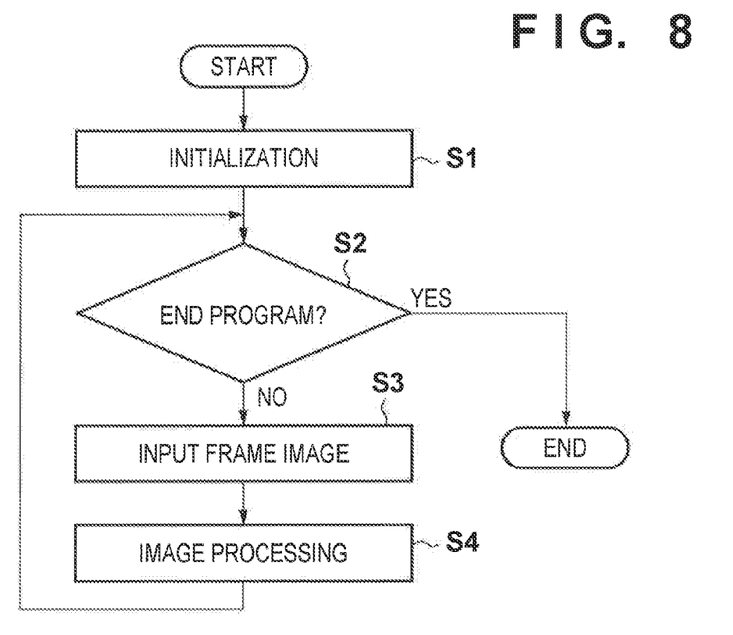
FIG. 8 is a flowchart depicting execution of an image processing application performed by the information processing apparatus according to the second embodiment.

FIG. 8 is a flowchart showing execution of the image processing application in the information processing apparatus according to the present embodiment.

At S1 the CPU 301 performs initialization such as setting the parameters used in the program to initial values. At S2 the CPU 301 determines whether or not the program is instructed to end. For example, the CPU 301 may determine whether or not an instruction to end the program is input from the instruction input unit 303.

At S3 the CPU 301 controls the camera 306 to read out a moving image captured by the camera 306 in units of frames and stores the moving image in the working area in the memory 302. The moving image may be a moving image captured in real time or a moving image reproduced from a recording medium in the camera 306. At S4 the CPU 301 performs the recursive NR corresponding to the above-described operation of the NR unit 4 on the read frame and returns to the process of S2.

Figure 9:
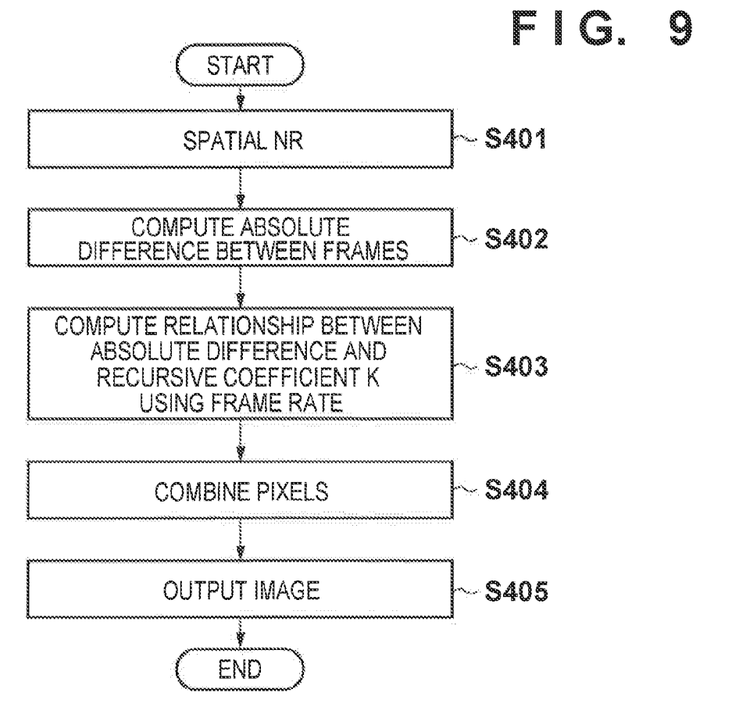
FIG. 9 is a flowchart depicting the detail of image processing at S4 in FIG. 8.

The detail of the recursive NR at S4 is described with reference to the flowchart in FIG. 9.

At S401 the CPU 301 performs spatial NR on the frame (current frame) read at S3 by two-dimensionally applying computation corresponding to the ε-filter and writes back the frame to the memory 302. At S402 the CPU 301 applies low-pass filter operation corresponding to the LPF 403 to the current frame after being subjected to the spatial NR. The CPU 301 then computes, for every pixel, an absolute difference between a previous frame read out from the frame memory 408 (in the case of the variation of the first embodiment) and the current frame after being subjected to the LPF process. At S403 the CPU 301 computes a recursive coefficient K using the absolute difference between the frames, the image frame rate of the moving image, and a table read out from the external storage device 304. The image frame rate of the moving image may be a value configured by a user from the image processing application, or acquired from the camera 306 or moving image data before reading out the image from camera 306. At S404 the CPU 301 calculates a weighted mean (combination) between the two frames based on the recursive coefficient K. At S405 the CPU 301 outputs, as a recursive NR result, the frame obtained after the weighted mean process to, for example, the external storage device 304 and stores the frame in the frame memory 408 (memory 302).

The thus obtained frame obtained at S404 may alternatively be further combined with the current frame before being stored in the frame memory 408, as performed by the second combination unit 409.

According to the present embodiment, the same effect as in the first embodiment (including the variation) is achieved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-102342, filed on Apr. 28, 2011, which is hereby incorporated by reference herein its entirety.

What is claimed is:

1. An image processing apparatus for applying recursive noise reduction to a moving image having a predetermined frame rate, the image processing apparatus comprising;
   a computation unit that computes information indicating at degree of correlation between a current frame and a previous frame that is one frame before the current frame, using a pixel value of the current frame to which the recursive noise reduction is to be applied and a pixel value of the previous frame to which the recursive noise reduction has been applied;
   a determination unit that determines a recursive coefficient, which is a weight of the previous frame, based on the degree of correlation and the frame rate;
   a first combination unit that combines pixels in the previous frame and the current frame using the recursive coefficient; and
   an output unit that outputs the frame obtained by the first combination unit as the current frame to which the recursive noise reduction has been applied,
   wherein for the same degree of correlation indicated by the information computed by the computation unit, the determination unit determines the recursive coefficient of a first value if the frame rate is a first frame rate, and determines the recursive coefficient of a second value being smaller than the first value if the frame rate is a second frame rate being lower than the first frame rate.

2. The image processing apparatus according to claim 1, wherein for the same frame rate, the determination unit determines the recursive coefficient of a third value if the correlation is a first degree, and determines the recursive coefficient of a fourth value being larger than the third value if the correlation is a second degree being larger than the first degree.

3. The image processing apparatus according to claim 2, wherein for the same frame rate, the determination unit determines the recursive coefficient to be larger as the correlation is larger.

4. The image processing apparatus according to claim 1, further comprising a second combination unit that combines pixels in the current frames before and after being subjected to the recursive noise reduction,
   wherein the second combination unit performs the combination such that the weight of the current frame after being subjected to the recursive noise reduction is smaller as the frame rate is lower, and
   wherein the first combination unit combines pixels in the frame obtained by the second combination unit and the current frame.

5. The image processing apparatus according to claim 1, further comprising a filtering unit that applies spatial noise reduction to the current frame before applying the recursive noise reduction thereto.

6. The image processing apparatus according to claim 1, wherein the computation unit computes a difference between the pixel values in the current frame and the previous frame as the information indicating the degree of correlation.

7. The image processing apparatus according to claim 1, wherein for the same degree of correlation indicated by the information computed by the computation unit, the determination unit determines the recursive coefficient to be smaller as the frame rate is lower.

8. A method for controlling an image processing apparatus for applying recursive noise reduction to a moving image having a predetermined frame rate, comprising:
   computing information indicating a degree of a correlation between a previous frame and a current frame using a pixel value of the current frame to which the recursive noise reduction is to be applied and a pixel value of the previous frame that is one frame before the current frame to which the recursive noise reduction has been applied;
   determining a recursive coefficient, which is a weight of the previous frame, based on the degree of the correlation and the frame rate;
   combining pixels in the previous frame and the current frame using the recursive coefficient; and
   outputting the frame obtained by the the combining step as the current frame after being subjected to the recursive noise reduction,
   wherein in the determining step, for the same degree of the correlation indicated by the information computed in the computing step, it is determined that the recursive coefficient of a first value if the frame rate is a first frame rate, and that the recursive coefficient of a second value being smaller than the first value if the frame rate is a second frame rate being lower than the first frame rate.

9. A non-transitory computer-readable recording medium storing a program for causing a computer to function as an image processing apparatus for applying recursive noise reduction to a moving image having a predetermined frame rate, the image processing apparatus comprising:
   a computation unit that computes information indicating a degree of correlation between a current frame and a previous frame that is one frame before the current frame, using a pixel value of the current frame to which the recursive noise reduction is to be applied and a pixel value of the previous frame to which the recursive noise reduction has been applied;
   a determination unit that determines a recursive coefficient, which is a weight of the previous frame, based on the degree of correlation and the frame rate;
   a first combination unit that combines pixels in the previous frame and the current frame using the recursive coefficient; and
   an output unit that outputs the frame obtained by the first combination unit as the current frame to which the recursive noise reduction has been applied,
   wherein for the same degree of correlation indicated by the information computed by the computation unit, the determination unit determines the recursive coefficient of a first value if the frame rate is a first frame rate, and determines the recursive coefficient of a second value being smaller than the first value if the frame rate is a second frame rate being lower than the first frame rate.

* * * * *